May 22, 1962 J. E. SADLER ET AL 3,035,389

FABRICATED COTTON PICKER BAR ASSEMBLY

Filed Sept. 26, 1958

INVENTORS
James E. Sadler
Robert L. Haley

Paul O. Pippel
Attorney

United States Patent Office 3,035,389
Patented May 22, 1962

3,035,389
FABRICATED COTTON PICKER BAR ASSEMBLY
James E. Sadler and Robert L. Haley, Memphis, Tenn., assignors to International Harvester Company, Chicago, Ill., a corporation of New Jersey
Filed Sept. 26, 1958, Ser. No. 763,491
8 Claims. (Cl. 56—44)

This invention relates to a picker bar for a cotton picker.

Cotton pickers with which the present invention is concerned are the type which comprise one or more picking drums which are composed of a plurality of upright bars, each of which carries internally thereof a vertical driving shaft which is intergeared with a plurality of vertically spaced substantially horizontally extending picking spindles. The drum rotates in a particular orbit and each of the bars are moved in a predetermined manner in order to sequentially project the spindles into the plants which are passing alongside the drum within a plant passage of the cotton picker and then withdrawing the spindles and positioning them for advantageous doffing by a doffing mechanism and presenting the spindles with a proper attitude to a moistener means which is adapted to continuously moisten the spindles before they are again advanced and projected into the plants.

The picking bar is thus a critical element in the efficiency of the cotton picker and has been extremely expensive to manufacture in controlling the critical dimensions.

Another problem which has arisen with these cotton picking bars is in holding and maintaining the bearings within the bar which support the vertical drive shaft. To avoid creep various procedures have had to be worked out to resize the bars or replace bearings, etc.

A general object of the invention is to provide a novel cotton picker bar structure which is readily adaptable as a substitute for the conventional present bar structure and which is relatively simple to manufacture and which will provide long life and rugged durability in service.

A more specific object of the invention is to provide a novel cotton picking bar wherein the bar proper is in the form of a column made up of a U-shaped sheet metal structure with the spindle supporting closure across the legs of the U and the structure or bar functioning to interlock the bearings within the bar.

These and other objects of the invention will become more apparent from the specification and the drawings, wherein.

Figure 1:
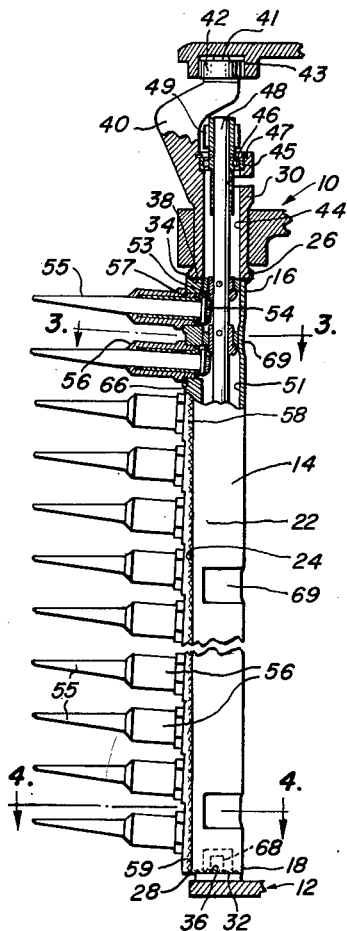
FIGURE 1 is a side view, partially in section and with parts broken away and shown in section, illustrating a representative picker bar as mounted in upper and lower drum supports.
Figure 2:
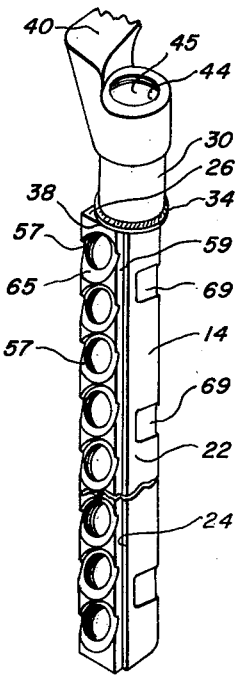
FIGURE 2 is a fragmentary perspective view of the column and crank arm structure of the bar.
Figure 3:
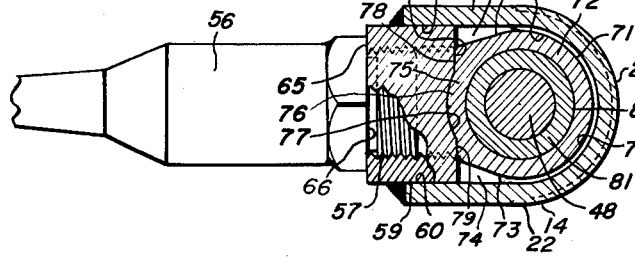
FIGURE 3 is an enlarged cross sectional view taken substantially on the line 3—3 of FIGURE 1.
Figure 4:
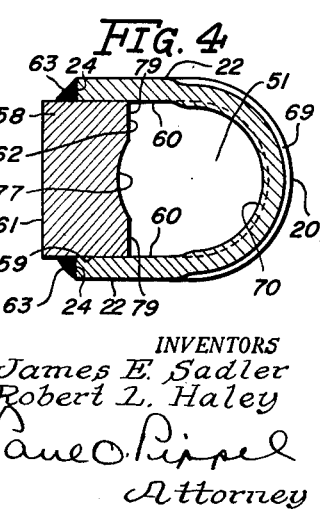
FIGURE 4 is an enlarged cross sectional view of the column taken substantially on the line 4—4 of FIGURE 1.

Describing the invention in detail and having particular reference to the drawings, a cotton picker drum is substantially that shown and described in Johnston U.S. Patent 2,140,631, has upper and lower supporting portions in the form of a drum head and a lower bottom plate, the head being indicated at 10 and the bottom plate at 12. The head and plate 10 and 12 carry therebetween a plurality of picker bars, only one of which is shown here, each bar comprising an elongated hollow support or column 14 which has top and bottom ends 16 and 18 respectively and is a channel or U-shaped section as best seen in FIGURES 3 and 4, the bight portion of the U affording a closed upright rear wall 20 and the legs of the U respectively affording parallel upright side walls 22.

The bight portion or rear wall 20 of the column is of arcuate section and the side walls or legs 22 extend a considerable distance forwardly so that the column has a substantial transverse depth parallel to the walls 22.

Each side wall 22 has a free upright front edge 24 and substantially horizontal top and bottom edges 26 and 28.

Top and bottom trunnions 30 and 32 are secured respectively to the top and bottom ends of the column 14, the said trunnions forming in effect coaxial extensions of the bight portion of the column. The securement of these trunnions is preferably as by welding, indicated at 34 and 36.

It will be seen that the diameter of the upper trunnion is such that it projects forwardly of the forward edges of the side walls 22 and provides a bottom guide surface 38 for a purpose hereinafter to be described.

The upper trunnion 30 is preferably in the nature of a forging and comprises an integral upwardly extending crank arm 40 which at its upper end is provided with a roller pivot 41 which carries a roller 42, roller 42 being disposed and guided within a cam track 43, as is well known to those skilled in the art and as discussed in the aforementioned patent. The trunnion 30 has a vertical bore 44 therein which at its upper end is provided with a bearing seat 45 mounting a bearing 46 with a snap ring 47, the bearing 46 admitting a vertical drive shaft 48 which is fastened at its upper end to a gear 49, the said gear being driven from a master gear as indicated in the aforementioned patent.

The shaft 48 extends downwardly through the bore 51 formed in the column by the walls 20 and 22 and at predetermined spaced intervals mounts and is connected to a bevel gear 53 which meshes with a bevel gear 54 on the inner end of an associated spindle 55. Each spindle 55 is mounted within a nut or holder 56 which is threaded at its inner end into the threaded aperture or opening 57 in a mounting enclosure plate or bar 58.

The bar 58 is a one-piece spindle-supporting member and is preferably rectangular in cross section having a pair of vertical side surfaces 59 which snugly fit within the inner surfaces 60 of the side walls 22. The bar is positioned within the open side of the column approximately midway between its inner and outer vertical sides 61 and 62. The outer free edges 24 of the walls 22 of the column are welded as at 63 to the faces 59 of the bar 58 thus completing a tubular structure. In the manufacture the U-shaped column portion is placed in a suitable jig and the bar 58 inserted between the faces 60 and welded. Thereafter it is suitably machined to provide the drilled and threaded apertures 57 and the seating faces 65 against which the inner sides 66 of the nut portions 56 seat, the said surface 65 being stepped in order to position the spindles so that the center line of each spindle would be disposed at an angle of about 3° and 22 minutes upwardly from the horizontal. Under certain conditions this inclination may be raised to 4°.

It will be seen that the bottom journal 36 is mounted on a vertical spindle 68 which is connected to the bottom plate 12.

A feature of the present invention is in the offsetting or indenting to provide lands 69 along the length of the bar which may be accomplished by a suitable press at the same time that the column 14 is being made and preferably these indents or offsets each provide an approximately semi-cylindrical internal seating surface 70 which bears against the outer complementary side 71 on the back edge of a shaft-mounting bearing or bearing member 72, the said bearing member 72 being somewhat horseshoe-shaped in plan and at its lateral sides 73 converging from the rear side 71 toward the forward side of the column to provide lubricant passages 74 between the same and the internal surfaces 60 of the side walls 22 adjacent to their juncture with the member 58. The forward side 75 of the bearing 71 is provided with a forwardly convex central locating portion 76 which enters a vertical groove 77 formed on the back side 62 of the member 58, said groove 77 and the seating surface 70 being broached or otherwise machined to be extremely accurate so that the bearing member 71 will fit snugly within the bore. The forward side of the bearing 71 also has a pair of flanking or lateral side surfaces 78 which engage complementary surfaces 79 on opposite sides of the groove 77.

Thus it will be seen that the bearings 71 are properly located in order to maintain the pair of grooves open. The bearings each have a center bore 80 for admitting a shank portion 81 of an associated bevel gear which is sleeved over the shaft 48.

Thus it will be seen that a novel and simple and inexpensive structure is provided and that there are very few parts which must be machined to accurate tolerances so that the structure is relatively inexpensive to make.

What is claimed is:

1. A picker bar, comprising: an elongated column of U-shaped section having top and bottom open ends, and comprising a bight portion affording a rear wall and a pair of forwardly projecting upright side walls, said side walls having upright front edges and confronting inner faces, a spindle-supporting closure member fitting between said faces and having sides engaging respective faces, weld means interconnecting said sides of the member with said edges, a trunnion mounted upon the top end of the column and weld-connected thereto and projecting forwardly of said front edges and providing a guide surface facing toward the column and engaging an adjacent end of said member.

2. The invention according to claim 1 and a plurality of spaced lands offset inwardly from said rear wall and each providing a substantially semi-cylindrical seating surface, and shaft-mounting bearings in said column at each land, each said bearing having a rear surface in complementary engagement with the seat and having side surfaces diverging forwardly with respect to said faces on said side walls and defining lubricant passages therewith.

3. The invention according to claim 2 and each said bearing comprising a front side having a convex central guide portion, and the closure member having a back side with a groove complementally receiving said guide portion.

4. The invention according to claim 3 and each said bearing and said closure member having inter-engaging generally flat abutment surfaces flanking said guide portion and preventing turning of the bearing.

5. A picker bar, comprising: an elongated column of U-shaped section and having top and bottom open ends, the bight portion of the U providing an upright rear wall and the legs of the U respectively affording upright forwardly projecting side walls, each side wall having an upright front edge and said front edges being spaced apart to afford an elongated upright front slot leading into the interior of the column; top and bottom trunnions secured respectively to the top and bottom ends of the column as axial extensions thereof; an upright drive shaft assembly journalled in the column and contained substantially coaxially in the bight portion thereof, and said shaft assembly including axially spaced apart driving elements thereon; said top trunnion extending forwardly of the forward edges of the column and providing a bottom guide edge thereat; an elongated upright block member rearwardly receivable in and supported from the column between said side walls, means fixedly securing opposite sides of the block member with said forward edges, said block member having a rear face proximate to but spaced forwardly from the drive shaft and having a forward face exposed at the front of the column, said block member having therein a plurality of transverse spindle bores equal in number to and vertically spaced apart on the order of the driving elements on the shaft, each bore opening at opposite ends respectively at the front and rear faces of the block; a plurality of picker spindles journalled in the block member, one in each bore, each spindle having a driven element rearwardly engageable with and forwardly disengageable from a respective driving element; and a plurality of vertically spaced bearing means mounted in the column and journalling said shaft assembly and each comprising an arcuate rear side in complementary engagement with a portion of the rear wall of the column and lateral sides spaced inwardly of the side walls of the column and defining vertical lubricant passages therewith and having a forward face in abutment with the rear face of the block member.

6. The invention according to claim 5 and said rear wall having a land as an integral offset in axial alignment with each said bearing means and in engagement therewith.

7. The combination of a cotton picker bar forming an enclosure having a semicylindrical bearing supporting surface terminating at opposite ends in substantially tangent extensions, and a spindle supporting member interconnecting said extensions and presenting a pair of generally flat surfaces at opposite sides adjacent to respective extensions and a concave locating surface intermediate said flat surfaces substantially coincident with said bearing supporting surface.

8. The invention according to claim 7 and a bearing member in the enclosure having a semicylindrical surface in engagement with said semicylindrical surface and having side surfaces extending from the semicylindrical surface of the bearing and disposed alongside the respective extensions and diverging therefrom to define oil passages therewith and further having intermediate said side surfaces a convex locater surface and flanking positioning surfaces in engagement with said flat surfaces and concave surface respectively.

References Cited in the file of this patent

UNITED STATES PATENTS

| | | |
|---|---|---|
| 655,633 | Lee et al. | Aug. 7, 1900 |
| 1,419,858 | Kagi | June 13, 1922 |
| 1,978,576 | Harbert | Oct. 30, 1934 |
| 2,743,569 | Barbknecht et al. | May 1, 1956 |
| 2,766,574 | Hubbard | Oct. 16, 1956 |
| 2,785,523 | Frudden | Mar. 19, 1957 |